Feb. 7, 1961     E. MILLER     2,970,530
EXPOSURE CONTROL UNIT FOR PHOTOGRAPHIC CAMERAS
Filed July 31, 1959     4 Sheets-Sheet 1

*INVENTOR.*
EUGENE MILLER
BY
Attorney

INVENTOR.
EUGENE MILLER

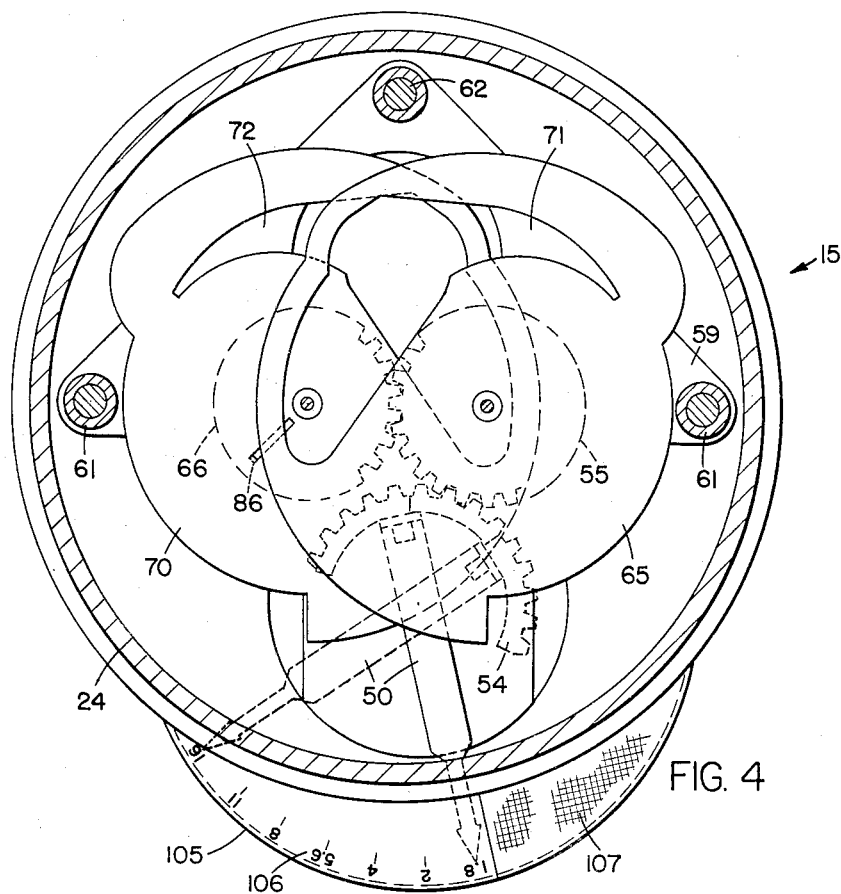
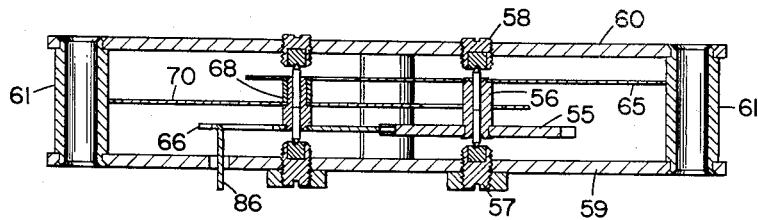
FIG. 4
FIG. 5

Feb. 7, 1961 E. MILLER 2,970,530
EXPOSURE CONTROL UNIT FOR PHOTOGRAPHIC CAMERAS
Filed July 31, 1959 4 Sheets-Sheet 4

INVENTOR.
EUGENE MILLER
BY
Attorney

United States Patent Office 2,970,530
Patented Feb. 7, 1961

2,970,530

EXPOSURE CONTROL UNIT FOR PHOTOGRAPHIC CAMERAS

Eugene Miller, Rochester, N.Y., assignor to Elgeet Optical Company, Inc., Rochester, N.Y., a corporation of New York Filed July 31, 1959, Ser. No. 830,893

3 Claims. (Cl. 95—64)

The present invention relates to apparatus for adjusting the exposure aperture of a photographic camera so as to provide the proper exposure opening under different light conditions.

Experience has demonstrated that incorrect exposure is the main cause of unsatisfactory pictures, especially color pictures. In fact, for color pictures the correct determination of the existing light conditions and the correct setting of the diaphragm opening to suit existing light conditions are practical necessities. It is quite common, therefore, to employ light meters for determining the optimum amount of light which, when passed through the lens of a camera, will properly expose the photosensitive emulsion.

It has been found, however, that even using a good camera and a good exposure meter, the percentage of satisfactory color pictures is relatively low because of the difference between the acceptance angle of the camera and that of the hand-held exposure meter. Moreover, with the ordinary hand-carried exposure meter, the correct values on the oftentime rather complicated instrument must not only be first found and adjusted, but the results obtained must then be translated to the camera dials or other setting mechanism of the camera in order to set the diaphragm opening correctly. This entails loss of time, especially in the case of snapshots of rapidly moving objects, so that often a particular, unique situation is lost before the picture of it can be taken. Another serious defect of the hand-carried exposure meter, moreover, is that while its values are correct for an average camera construction, they differ from the values appropriate to a different type of camera, especially with respect to the reduction of light caused by the lens system and the acceptance angle, which differ from camera to camera. This makes it necessary for the photographer to calibrate by careful cut and try methods his exposure meter for his own camera; and even then he must first read the meter and then translate his reading into a manual setting of the diaphragm aperture.

Because of the disadvantages of the hand-carried exposure meter, exposure meters have in some instances been built into cameras. The disadvantages of these in-mounted meters are that they are space-consuming, especially in the limited space conditions of miniature cameras. Moreover, they require expensive, fine mechanical and electrical transmission and regulation parts. If any trouble or damage occurs by reason of corrosion or wear, or from dropping the camera, the whole camera must be sent back to the manufacturer.

A primary object of the present invention is to provide apparatus for automatically adjusting the exposure aperture of a camera.

Another object of the invention is to provide an exposure meter which is associated with the objective lens of a camera so that the proper diaphragm opening can be determined and adjusted automatically.

Another object of the invention is to provide an exposure meter construction, which is mountable on a camera, but which does not have to be built into the camera, and which is clear of the objections of previous camera-mounted meters.

Another object of the invention is to provide an exposure meter mounting which is detachable from the camera and which will permit the exposure meter to be repaired, if required, without requiring return of the whole camera to the factory.

Another object of the invention is to provide a unitary construction in which the objective lens, diaphragm, exposure meter and automatic aperture setting mechanism are combined in a single unit that is directly substitutable for a conventional objective of a camera.

Another object of the invention is to provide a unit of the character described which will be compact, highly accurate, and which is adaptable to most existing types of still and moving picture cameras.

Other objects of the invention are to provide a unit of the character described having simple and robust construction, properly sealed, protected from aging, corrosion, and abrasion of movable parts, composed of a few simple elements, making its assembly easy and relatively inexpensive, and which is easy to repair.

Other objects of the invention will be apparent hereinafter from the specification and from the recital of the appended claims when taken in conjunction with the accompanying drawings.

In the drawings:

Fig. 4 is a section through this unit taken on the line 4—4 of Fig. 3 and looking in the direction of the arrows;

Fig. 5 is a fragmentary section through the unit taken at right angles to the view of Fig. 4 and showing particularly the diaphragm leaves, their attached gears and their mounting;

Figure 1:
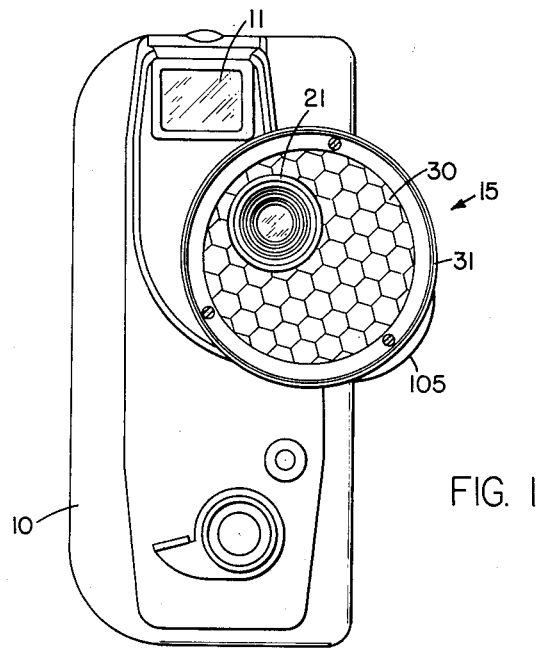
Fig. 1 is a front elevation of a conventional camera on which is mounted a combined exposure meter, lens and diaphragm unit made according to one embodiment of this invention.
Figure 2:
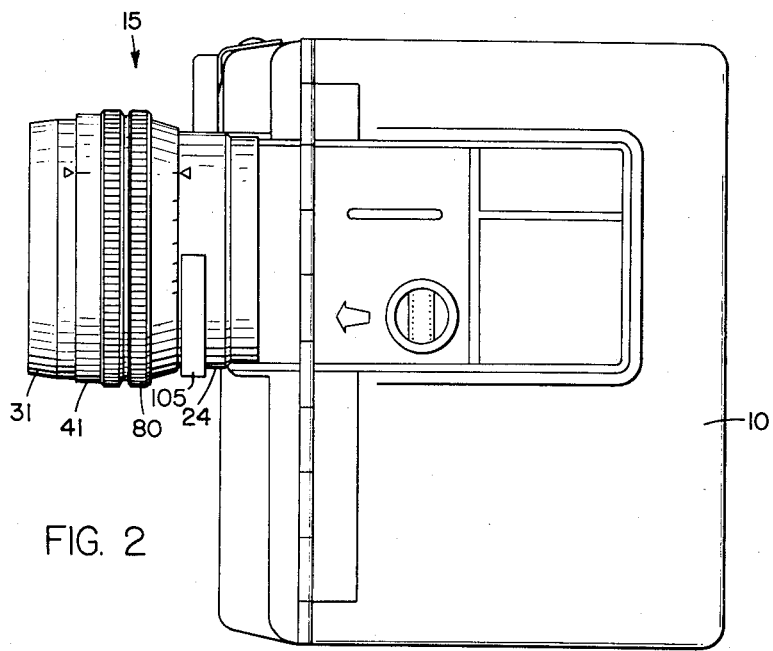
Fig. 2 is a side elevation of the camera with the exposure aperture control unit mounted thereon.
Figure 3:
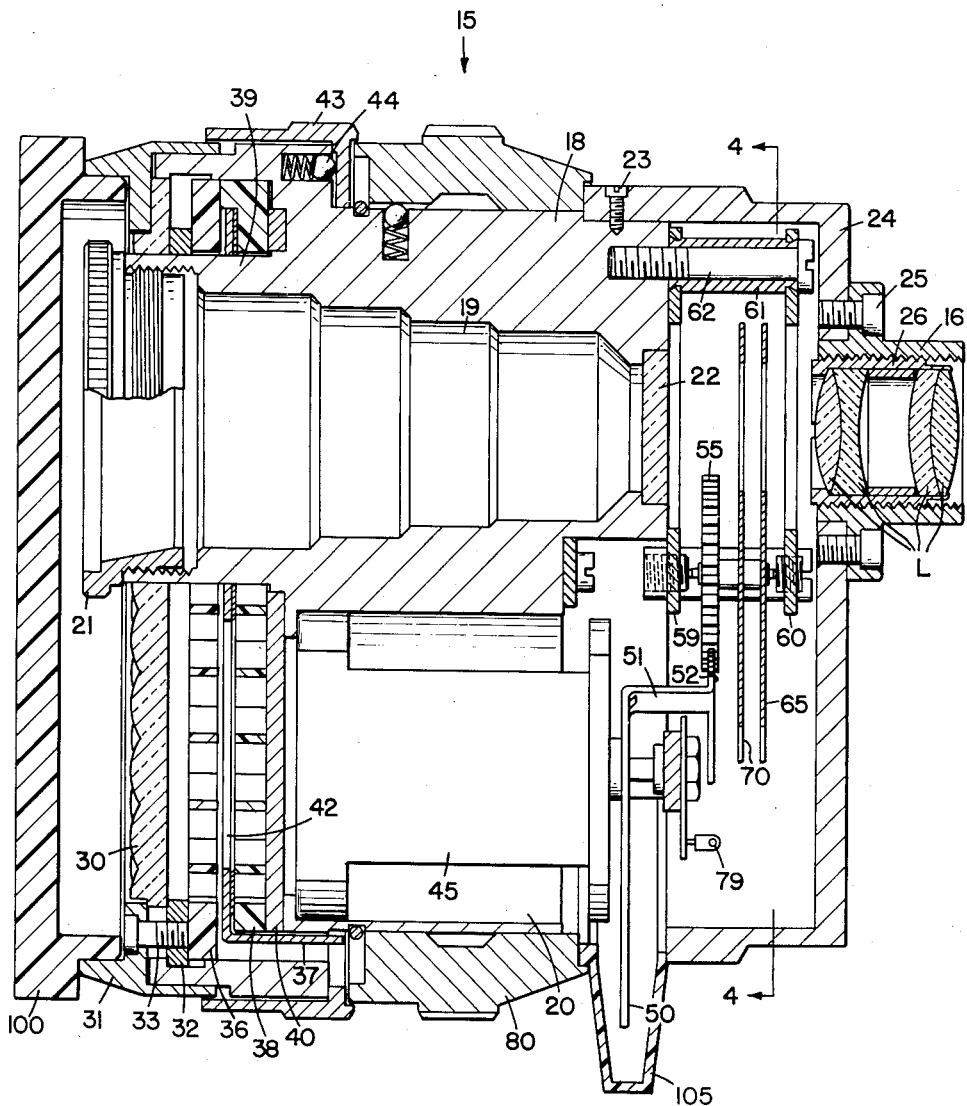
Fig. 3 is a longitudinal, or axial section through the exposure control unit on an enlarged scale.

Referring now to the drawings by numerals of reference, 10 denotes the casing of a conventional camera; and 11 denotes the front window of the conventional viewfinder of this camera. Removably mounted on this camera is an automatic diaphragm aperture control unit 15 made according to one embodiment of this invention. This device is intended to be used in place of the ordinary removable objective lens mount of the camera, and has an adapter 16 (Fig. 3) secured to it by means of which the device is supported on the front of the camera in place of the conventional objective lens mount.

The control unit comprises a housing 18 (Fig. 3) which is formed with two parallel axially-extending chambers 19 and 20. Threaded in the front end of the chamber 19 is a ring 21 which carries a filter; and secured in the rear end of the chamber 19 in axial alignment with the filter ring is a coated cover glass 22.

Fastened to the housing 18 at the rear thereof by means, for instance, of screws 23 is a back case 24. The adapter 16 is removably secured to the back case by screws 25. Threaded into the adapter in axial alignment with the filter and cover glass is a lens mount 26 which contains the lenses L of the unit.

The housing is recessed at its front end to provide a recess that extends in front of the chamber 20 and that surrounds the forwardly projecting wall 39 of the chamber 19. Mounted in this recess is a cylindrical multi-cell lens or grid 30, which is bored to receive the wall 39. The multi-cell lens is secured between rings 31 and 32 by screws 33. Behind the multi-cell lens are mounted a honeycomb grid 36, one or more masks 37, and a honeycomb grid 38. Behind these is mounted a photoelectric cell 40. Each of the masks and the photoelectric cell are mounted in the front recess of the housing and surround the tubular wall 39 of the housing. Mounted in the chamber 20, behind the photoelectric cell and electrically connected thereto is a galvanometer 45.

Each of the masks may be of conventional type having a generally spiral shaped slot 42 therein. A ring 43, which is manually rotatable on the housing, and which is held in any adjusted position by a spring-pressed ball detent 44, serves for rotatable manual adjustment of the mask 37 to control the amount of light falling on the photocell. Ring 43 is connected to the mask by a tongue.

The galvanometer is of conventional type and may comprise a magnetized block surrounded by a rotatable wire coil that is mounted for rotation in the galvanometer housing.

Secured to the coil of the galvanometer to rotate therewith is the meter pointer arm 50. This arm is bent at right angles as denoted at 51, and is again bent at right angles, as denoted at 52, and with the latter bend there is formed integral a gear segment 54 (Fig. 4). The segment 54 meshes with the wide face gear 55 (Fig. 5) that is staked to a pivot shaft 56. This shaft is provided with centers at opposite ends that engage the jewel bearings 57 and 58, respectively, which are adjustably threaded in the bridge plates 59 and 60, respectively.

The bridge plates 59 and 60 are of open triangular formation and are staked to sleeves 61. The sleeves 61 receive bolts 62 which thread into housing 18 and by which the bridges are fastened in place on housing 18.

Staked to the shaft 56 to rotate therewith is a diaphragm leaf 65. Meshing with the gear 55 is another gear 66 which is secured to a pivot shaft 68 that is mounted parallel to the shaft 56 and that is centered in similar manner. The shaft 68 has a diaphragm leaf 70 staked thereto.

Figure 6:
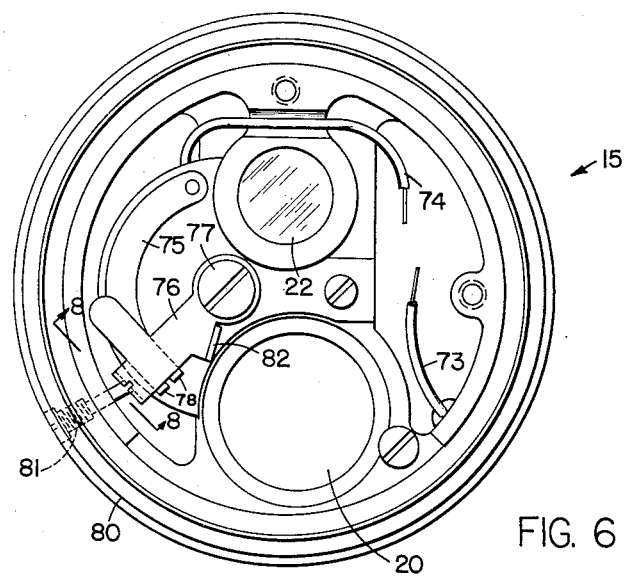
Fig. 6 is a rear view on a reduced scale of the exposure control unit with the galvanometer removed, and showing particularly the means for manually adjusting the exposure aperture.

Each diaphragm leaf has an irregular opening cut in it. These openings are designated 71 and 72, respectively, for the two leaves 65 and 70, respectively. The two leaves are positioned so that these openings are disposed in front of the lenses L. The two openings are preferably alike but reversed with reference to one another. In the closed-down position of the diaphragm the narrow portions of the two openings 71 and 72 overlap so that very little light passes through the lenses L to the film at the focal plane of the camera. In the open position of the diaphragm leaves the two openings 71 and 72 form a large opening allowing a lot of light to pass through the lenses to the focal plane. The amount of movement of the diaphragm leaves depends, of course, upon the amount of light falling on the photoelectric cell 40 which is connected in series through line 73 (Fig. 6) with a conventional resistor-thermistor (not shown) which, in turn, is connected through a line 74 with a switch plate 75 that is fastened to the housing 18 but insulated therefrom.

A pick-up arm 76 that is pivotally mounted by means of a screw 77 to the housing has a flexible spring contact 78 riveted to it. Contact 78 is adapted to engage and ride on plate 75. The coil of the galvanometer is connected by a lead wire 79 (Fig. 3) to the switch or contact 78. When the contact 78 is out of contact with plate 75, the photoelectric cell is connected in series with the galvanometer coil and the resistor-thermistor. Since rotary movement of the galvanometer coil effects movement of the diaphragm leaves and consequent variation in the diaphragm opening, it will be seen then that light impinging on the photoelectric cell 40 energizes the galvanometer coil in proportion to the intensity of the light and that accordingly the diaphragm opening will automatically correspond with the light intensity when the unit is being used.

The diaphragm leaves are balanced in themselves, and so is the galvanometer. However, the inertia of one leaf does not balance the other because there is a wide face gear 55 secured to the shaft which carries one leaf 65, to permit of axial adjustment of the leaves relative to one another.

In the device of the present invention the galvanometer pointer 50 drives one diaphragm leaf 65 through gearing 54, 55, and the other diaphragm leaf 70 is driven through gearing 55, 66 from the shaft of the direct connected leaf. Therefore, the directly connected diaphragm leaf rotates in the opposite direction from the galvanometer coil while the other diaphragm leaf rotates in the same direction as the galvanometer coil.

To permit adjustment of the diaphragm opening for under-exposure or over-exposure, means is provided for manually adjusting the diaphragm leaves. This means comprises a ring 80 (Figs. 3 and 6) rotatably mounted on the housing 18. This ring is connected by a screw 81 to the pick-up arm 76. The screw 81 engages in a notch in arm 76. This arm has an abutment member 82 integral with it. The abutment member 82 is adapted to engage a second abutment member 86 (Fig. 5) which is integral with and is struck up from the gear 66 to rotate gear 66 and vary the diaphragm opening. The abutment 82 is so disposed that for it to engage the abutment 86, contact 78 must ride onto switch plate 75. Thus, for under-exposure or over-exposure the diaphragm opening can be manually adjusted and at the same time the electrical connection to the galvanometer coil may be broken, or the galvanometer coil may be shunted out of circuit with the photoelectric cell; in either case deenergizing the galvanometer coil.

The indicator pointer 50 moves in the space between the ring 80 and the case 24. This space is covered by a transparent plastic dome 105 through which the pointer is visible. The rear face of this dome is graduated along part of its length as denoted at 106. The rest of the rear face of the dome is shaded to be opaque, as denoted at 107. The pointer can be read directly against the scale 106; and the scale will indicate the desirable diaphragm aperture under prevailing light conditions. Thus the apparatus of the present invention can be used as an ordinary exposure meter if desired. When the pointer is within the shaded area 107, the available light is insufficient for proper exposure.

100 denotes a molded plastic lens cap designed to fit on the front of the casing and protect the lens system.

Figure 9:
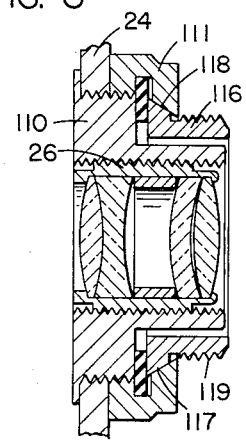
Fig. 9 is a fragmentary axial section showing how the unit of this invention may be equipped with an adapter for mounting it in the threaded lens opening of a conventional camera.
Figure 7:
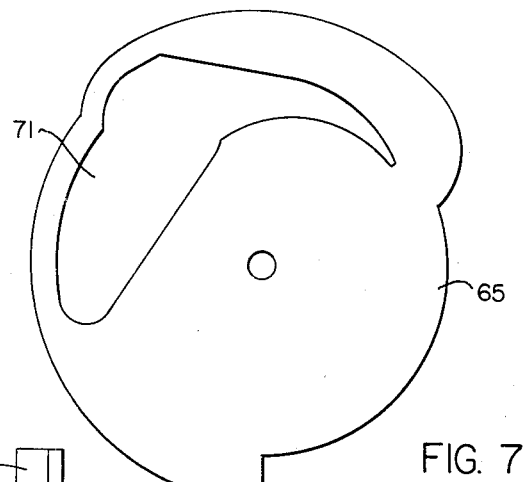
Fig. 7 is a side elevation of one of the iris or diaphragm leaves of the control unit on an enlarged scale.
Figure 8:
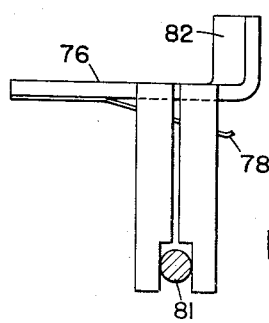
Fig. 8 is a view illustrating details of the manual adjustment mechanism.

It will be understood that instead of the adapter 16 shown, any suitable adapter may be used for mounting the control unit on the camera. Thus an adapter may be used which has an external thread and will thread into the conventional lens opening of a conventional camera. Such an adapter is shown in Fig. 9. Here the lens mount 26 is threaded into a sleeve 110 which, in turn, is threaded into the case 24. A ring 111 threads on sleeve 110. This ring serves to secure the adapter 116 to the case. The adapter has an external conical surface 117 and the ring has a corresponding internal conical surface 118, so that when the ring is threaded forwardly on the sleeve 110, the adapter is clamped to the case. The adapter is threaded externally as denoted at 119 to thread into the conventional lens opening of a standard camera.

thereby making it possible to equip a standard camera for automatic setting of the exposure aperture.

It will be seen from the preceding description that I have provided a unit which will control automatically the diaphragm aperture of a camera but with which the diaphragm aperture may also be adjusted manually independently of prevailing light conditions. At the same time, also, I have provided an exposure control unit which will enable a conventional camera to be converted into a camera with automatic diaphragm aperture control without any change in the camera structure itself.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A device intended to be used in place of the ordinary removable objective lens mount in a camera, which camera has both a viewfinder opening and a lens opening in its front face, said lens opening being closely adjacent said viewfinder opening, said device comprising a housing which is generally circular in cross-section, an objective lens system containing a plurality of axially-spaced lenses, said lens system being mounted in said housing eccentrically of said housing, a pair of diaphragm blades mounted in front of at least one of said lenses of said lens system for oscillation on spaced, parallel axes and lying in parallel planes, each of said blades having an aperture therethrough, the apertures in the two blades overlapping and being identical but reversed with reference to one another to form a diaphragm opening varying with the angular positions of the two blades, and means for automatically oscillating the two blades simultaneously about their respective axes comprising a light-sensitive cell for producing a current varying in accordance with light conditions, a galvanometer having a rotary coil electrically connected to said cell to rotate to different angular positions in accordance with variations in the current generated by said cell, said coil being positioned in said device at one side of said lens system with its axis of rotation parallel to said lens system, toothed gearing connecting said coil to one of said blades to rotate said blade on rotation of said coil, and toothed gearing connecting said one blade to the other blade to rotate said other blade in the opposite direction from said one blade but in the same direction as said coil, on rotation of said one blade, said device being a self-contained unit and having means for removably securing it to the front face of a camera with said device abutting against the front face of the camera and with said lens system in alignment with the lens opening of the camera and with said coil disposed further away from said viewfinder opening than said lens system, said housing being of a diameter greater than the distance from said lens opening to the viewfinder opening whereby the device may be mounted with said lens system in alignment with said lens opening in a position such that the device does not obscure the viewfinder opening.

2. A device intended to be used in place of the ordinary removable objective lens mount of a camera, which camera has both a viewfinder opening and a lens opening in its front face, said lens opening being closely adjacent said viewfinder opening, said device comprising a housing which is generally circular in cross-section and which has two offset, axially parallel chambers therein, one of said chambers being disposed eccentrically in said housing and being defined by a wall which protrudes forwardly beyond the other of said chambers, and said housing having a recess adjacent its front end which surrounds the forwardly protruding portion of said wall, a multicell lens, a honeycomb grid, a mask, and a photoelectric cell mounted in said recess, said mask being rotatably adjustable with reference to said cell, said cell producing an electric current varying in accordance with light conditions, a galvanometer mounted in the other chamber, said galvanometer including a rotatable coil electrically connected to said cell to rotate to different angular positions in accordance with variations in the current generated by said cell, a lens holder secured to said housing and having a plurality of lenses mounted therein in axial alignment with said one chamber, said coil being mounted to rotate about an axis parallel to but offset from the axis of said lenses, a pair of diaphragm blades lying in parallel planes and mounted in said housing between said one chamber and said lens holder for oscillation on spaced axes parallel to the axes of said chambers, each of said blades having an aperture therethrough, the apertures in the two blades overlapping and being identical but reversed with reference to one another to form a diaphragm opening varying with different angular positions of the two blades about their respective axes, a first gear connected to said coil at the rear of said galvanometer to rotate with said coil, a second gear secured to one of said blades and meshing with said first gear to rotate said one blade on rotation of said coil, and a third gear secured to the other blade and meshing with said second gear to rotate said other blade, on rotation of said coil in the same direction as said coil but in the opposite direction from said one blade, said device being a self-contained unit and having means for removably securing said housing to the front face of a camera with said housing abutting against the front face of the camera and with said lenses in alignment with the lens opening of the camera and with said other chamber offset from said lens opening and disposed further away from said viewfinder opening than said one chamber, said housing being of a diameter greater than the distance from said lens opening to said viewfinder opening, whereby said housing may be mounted on the camera with said lenses in alignment with said lens opening in a position such that the device does not obscure the viewfinder opening.

3. An attachment as claimed in claim 2 wherein the means for electrically connecting said cell to said coil includes a conductor plate, a contact member pivotal about an axis parallel to the axes of said blades and engageable with said plate to transmit current between said cell and said coil, said contact member having a first abutment thereon, and means for manually adjusting said diaphragm opening comprising a ring manually adjustable on said housing, means connecting said ring to said contact member to swing said contact member on its pivotal axis when said ring is adjusted, and a second abutment on said third gear positioned to be engaged by said first abutment when said contact member is pivoted far enough to engage said plate, whereby when said coil is shunted out of circuit with said cell said diaphragm opening can be adjusted manually.

References Cited in the file of this patent

UNITED STATES PATENTS

| | | |
|---|---|---|
| 2,039,969 | McIntosh | May 5, 1936 |
| 2,051,061 | Tonnies | Aug. 18, 1936 |
| 2,206,086 | Galyon | July 2, 1940 |
| 2,278,338 | Tonnies | Mar. 31, 1942 |
| 2,841,064 | Bagby et al. | July 1, 1958 |

FOREIGN PATENTS

| | | |
|---|---|---|
| 365,673 | Italy | Dec. 10, 1938 |
| 698,573 | Great Britain | Oct. 21, 1953 |